US007331111B2

(12) United States Patent
Myers

(10) Patent No.: US 7,331,111 B2
(45) **Date of Patent: *Feb. 19, 2008**

(54) CHAINSAW THROTTLE AND BRAKE MECHANISMS

(76) Inventor: Kent J. Myers, 9090 Stallion Rd., Magnolia, OH (US) 44643

( * ) Notice: Subject to any disclaimer, the term of this patent is extended or adjusted under 35 U.S.C. 154(b) by 177 days.

This patent is subject to a terminal disclaimer.

(21) Appl. No.: 11/180,443

(22) Filed: Jul. 12, 2005

(65) Prior Publication Data

US 2007/0011889 A1 Jan. 18, 2007

(51) Int. Cl.
*B23D 57/02* (2006.01)
*B23D 59/00* (2006.01)
*B23D 17/00* (2006.01)

(52) U.S. Cl. ........................... 30/382; 30/381; 30/383; 188/77 W

(58) Field of Classification Search ................. 30/183, 30/184, 189, 190, 381–385; 188/166, 77 W, 188/77 R
See application file for complete search history.

(56) References Cited

U.S. PATENT DOCUMENTS 3,785,465 A * 1/1974 Johansson .................. 192/48.5
4,594,780 A * 6/1986 Schliemann et al. .......... 30/382
4,683,660 A 8/1987 Schurr
4,753,012 A 6/1988 Schurr
4,860,848 A * 8/1989 Barth et al. ................. 180/197
5,004,392 A * 4/1991 Naab ........................... 414/21
5,031,715 A * 7/1991 Ogawa et al. .............. 180/179
5,060,613 A * 10/1991 Lieberoth-Leden et al. . 123/399
5,477,746 A * 12/1995 Perisho et al. ................ 74/512
5,718,052 A * 2/1998 Taomo et al. ................. 30/276
5,813,123 A * 9/1998 Wieland et al. ............... 30/382
5,947,866 A * 9/1999 Nagashima ................. 477/200
6,105,459 A * 8/2000 Troiano ....................... 74/542
6,842,987 B1 * 1/2005 Martinsson et al. .......... 30/382

* cited by examiner

*Primary Examiner*—Joseph J. Hail, III
*Assistant Examiner*—Alvin J Grant

(57) ABSTRACT

A chainsaw is provided having a brake band disposed about a drum that rotates during advancement of the saw chain about the saw bar. An end of the brake band is biased to a position that draws the brake band tight about the drum to prevent advancement of the saw chain, and the throttle trigger of the chainsaw is associated with this biased end to push the band against the bias and release the drum when the throttle trigger is squeezed to drive the elements of the chainsaw that serve to advance the saw chain. Also provided are new concepts for associating gasing and braking elements with the throttle trigger.

8 Claims, 4 Drawing Sheets

CHAINSAW THROTTLE AND BRAKE MECHANISMS

TECHNICAL FIELD

The present invention generally relates to chainsaws, and, more particularly, relates to braking mechanisms and throttle trigger mechanisms for providing added safety features to typical chainsaws, reducing chain run down time and finger fatigue.

BACKGROUND ART

Chainsaws are potentially dangerous tools even when operators exercise extreme caution during their use. Over the years, chainsaws have been manufactured to include braking mechanisms that are intended to function to stop the rotation of the saw chain about the saw bar in the event that the saw bar and the chain thereabout kick backwards toward the operator. These "kickback" brakes operate either through centrifugal forces or through impact of a hand guard with the operator's support arm used to support and maneuver the chainsaw. In either case, the kickback brakes operate through the movement of various elements from active positions, where the saw chain is permitted to rotate about the saw bar, to brake positions, where the saw chain is braked. When the kickback brakes are activated, the saw chain is stopped through well-known typically spring biased mechanisms.

When kickback brakes are activated to stop the saw chain, they are typically activated when the operator is running the saw chain at full throttle. And the components of the chainsaw that engage to stop the saw chain do so while those components are driven at top speeds.

Chainsaws also typically operate in such a manner that the saw chain may continue to rotate about the saw bar when the operator has let up on the throttle. This is generally known as chain run down. And even when the throttle is fully released, there is a chance that the saw chain may be moving at a rate fast enough to be dangerous. Attempts have therefor been made to associate components of the braking mechanism with the throttle to brake the saw chain upon release of the throttle and release the saw chain from the braked state upon squeezing the throttle. It is believed that these attempts have failed because they provide a chainsaw having a throttle that is too difficult to squeeze and keep depressed, leading to great finger fatigue. These designs also hurt an operator's trigger finger when the kickback braking mechanism is activated. An example of such a chainsaw is provided in U.S. Pat. No. 4,683,660, wherein a link extends from components of the kickback braking mechanism to the throttle such that squeezing the throttle pulls on the braking mechanism to release its braking of the saw chain, and letting up on the throttle allows the braking mechanism to return to a position that stops the moving saw chain. Other chainsaw embodiments are provided in U.S. Pat. Nos. 4,594,780; 4,753,012; 5,813,123; and 6,842,987. In at least some of these prior art embodiments, the braking mechanism components are associated with the kickback brake, and, when the operator trips the kickback brake, the braking mechanisms force the throttle trigger to its normal non-squeezed position, causing the operator's finger to be uncomfortably forced open. This trigger kickback contributes to finger fatigue, which is a very big concern, particularly for professionals that must operate chainsaws for their maximum suggested running times.

Although the prior art has addressed the inherent dangers in operating a chainsaw and has provided mechanisms in an attempt to make chainsaw operation safer, a need still exists for new safety mechanisms that are more reliable and safe not only for the operator but for the chainsaw as well. A need exists to provide chainsaws that reduce chain run down. A further need exists for a chainsaw that brakes the saw chain upon release of the throttle trigger, but does not suffer from trigger kickback upon tripping the kickback brake.

SUMMARY OF THE INVENTION

A chainsaw comprising a brake cable; and a throttle control mechanism including a throttle control trigger rotating at a pivot point between an off throttle position and an on throttle position, a freewheeling cam providing a ratchet tooth, wherein said brake cable is secured to said freewheeling cam; and an actuator arm associated with said throttle control trigger to rotate therewith, said actuator arm engaging said ratchet tooth of said freewheeling cam such that rotation of said throttle control trigger from said off throttle position to said on throttle position causes movement of said freewheeling cam through the engagement with said actuator arm, and movement of said freewheeling cam causes movement of said brake cable.

A chainsaw comprising a brake drum; a saw bar; an saw chain disposed about said saw bar, wherein rotation of said brake drum at sufficient velocity causes said saw chain to be advanced about said saw bar; a biasing mechanism; a brake band disposed around said brake drum and having a brake end that is associated with said biasing mechanism and biased thereby to draw said brake band against said brake drum and prevent the rotation thereof; a brake cable; and a throttle control mechanism including a throttle control trigger rotating at a pivot point between an off throttle position and an on throttle position, a freewheeling cam providing a ratchet tooth, wherein said brake cable is secured between said freewheeling cam and said biasing mechanism; and an actuator arm associated with said throttle control trigger to rotate therewith, said actuator arm engaging said ratchet tooth of said freewheeling cam such that rotation of said throttle control trigger from said off throttle position to said on throttle position causes movement of said freewheeling cam through the engagement with said actuator arm, and movement of said freewheeling cam causes movement of said brake cable to overcome the bias of said biasing mechanism and space said brake band from said brake drum.

A chainsaw comprising a throttle control trigger rotating at a pivot point between an off throttle position and an on throttle position; an arced brake control associated with said throttle control trigger; a cable secured to said arced brake control such that rotation of said throttle control trigger from said off throttle position to said on throttle position causes a portion of said cable to be wound on a perimeter of said arced brake control.

BRIEF DESCRIPTION OF THE DRAWINGS

For a complete understanding of the objects, embodiments and structure features of the present invention, reference should be made to the following detailed description and accompanying drawings wherein.

BRIEF DESCRIPTION OF THE PREFERRED EMBODIMENTS

Figure 1:
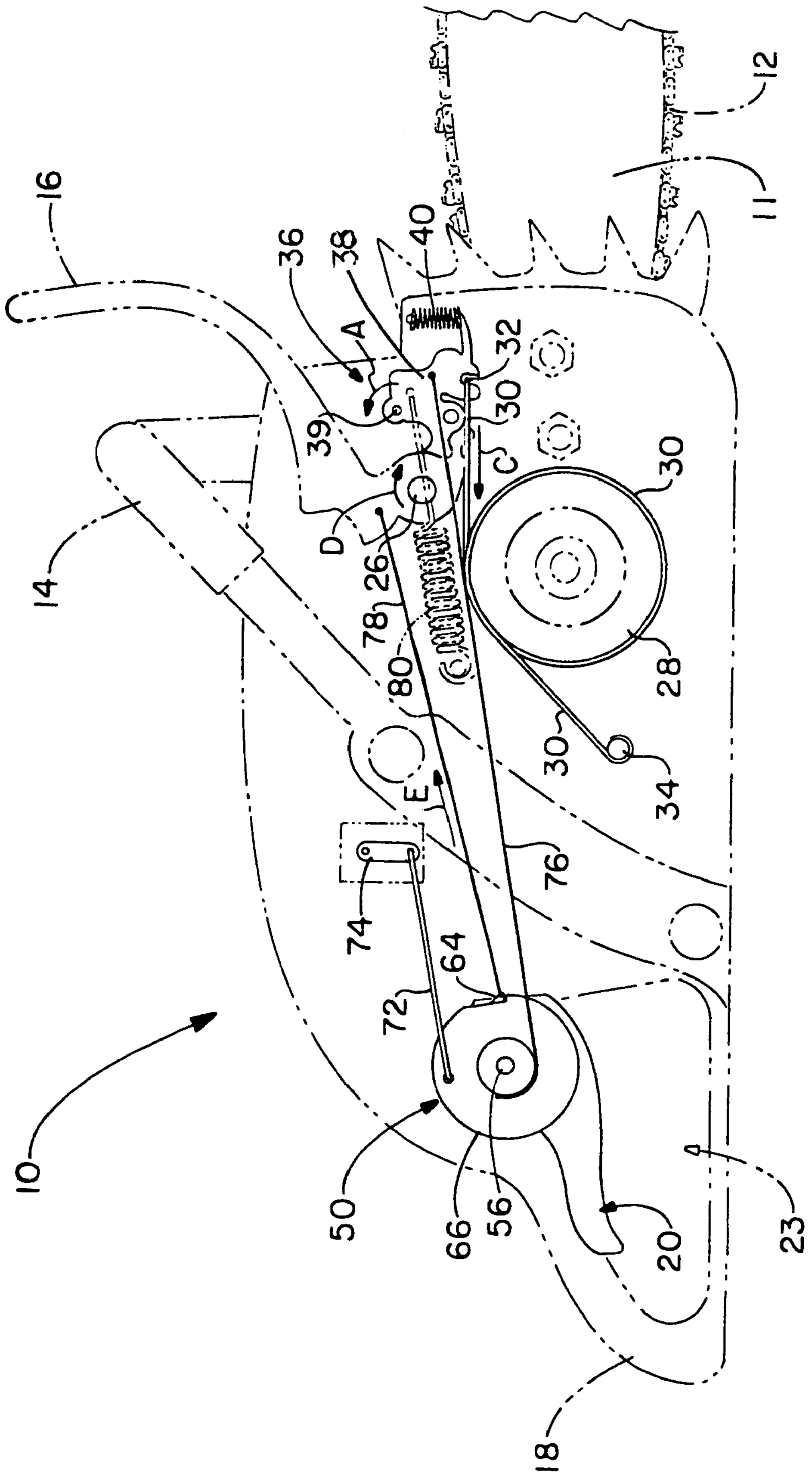
FIG. 1 is a side view of a chainsaw in accordance with this invention, shown with the throttle control trigger in the released position.

Referring now to FIG. 1, a chainsaw (or power saw) in accordance with this invention is shown and designated by the numeral 10. Chainsaw 10 includes saw bar 11 about which saw chain 12 advances. Handle frame 14 is secured to the main body of chainsaw 10, with kick back guard 16 located in front of it. Rear handle 18 is provided for gripping chainsaw 10 and providing access to throttle control trigger 20, which is shown in the normal off throttle position, at handle opening 23. As known, a component cover plate covers and/or houses (explained below) components controlling the advancement of saw chain 12 about saw bar 11, and also covers and/or houses braking mechanisms to control saw chain 12. These braking mechanisms are actuated by kickback guard 16, when it is moved forward about pivot point 26, whether by inertia or by contacting the operator's arm positioned at handle frame 14. This is all conventional and well-known prior art. The cover plate is intentionally not identified in the figures because, depending upon the particular chainsaw configuration being practiced, the figures provided could be considered as having the cover plate removed to show components behind the cover plate and secured to the main body of the chainsaw or may be considered as having the cover plate in place, but see-through, to show components secured to the cover plate. This is explained more fully below with respect to "inboard" and "outboard" chainsaw configurations well known in the art.

Chainsaws are primarily provided in two well-known configurations, termed "inboard" and "outboard," which refer to the location of the brake band and the kickback braking mechanisms that are associated with the kickback guard. In inboard configurations, the brake band and kickback braking mechanisms are secured in the main body of the saw, behind the cover plate. In outboard configurations, the brake band and braking mechanisms are secured to the backside of the cover plate. It will be readily apparent how this invention will be practiced with either the inboard or outboard configuration, although the inboard configuration is shown here. Additionally, it will be appreciated that different kickback braking mechanisms are provided in different chainsaws, and, although a particular configuration is shown, it will be readily apparent how this invention will be practiced with other braking mechanisms. Typically, these braking mechanisms work through the movement of lever arms and spring biased members when the kickback brake is activated through the movement of the kickback guard.

In the prior art, the saw chain is operatively connected to a brake drum, and the brake drum rotated as the saw chain is advanced around the saw bar. Typically, the brake drum is rotated by a centrifugal clutch that advances the saw chain around the saw bar, but the present invention is not limited thereto or thereby. As known, the centrifugal clutch is activated by squeezing the throttle trigger. A brake band is disposed around the brake drum, and is secured to the main body of the saw at one end, while being secured at its other end to movable braking mechanism components associated with the kickback brake guard.

In chainsaw embodiments of the type that are to specifically benefit from the practice of this invention, the brake band is normally biased to be drawn tight against the brake drum to prevent its rotation, thus preventing the advancement of the saw chain about the saw bar, i.e., chain run down. This bias must be overcome to loosen the brake band from about the brake drum to permit advancement of the chain. Thus, one end of the brake band is operationally associated with the throttle control trigger through a cable and lever arm such that squeezing the throttle control trigger moves that end of the brake band to loosen the brake band from about the brake drum. When the throttle control trigger is squeezed to provide power to advance the chain, the brake drum is released from the braked state. When the throttle control trigger is released, the brake band is moved by the bias force back to its normal position, wherein the brake drum is engaged by the brake band and prevented from rotating. Regardless of whether or not the throttle control trigger is squeezed, activating the kickback brake through movement of the kickback guard pulls on the brake band to tighten it about the brake drum and prevent further advancement of the saw chain about the saw bar. This is generally disclosed in U.S. Pat. Nos. 4,594,780; 4,683,660; 4,753,012; 5,813,123; and 6,842,987. Thus, this is all well-known to those of ordinary skill in the art, and it is from these well-known configurations that the present invention departs in order to provide benefits heretofore never realized in the chainsaw arts.

Particularly, in the type of chainsaw generally discussed above, tripping the kickback braking mechanism moves the lever arm associated with the brake band and, thus, moves the cable that connects to the throttle control trigger. This causes the throttle control mechanism to be forced to its normal non-squeezed position at the same time that the end of the brake band is moved to draw the brake band against the brake drum. The throttle control trigger is thus forced against the operators fingers, which are typically squeezing the throttle control trigger at full throttle. This can be painful and certainly increases finger fatigue.

The present invention provides a new throttle control mechanism that alters the manner in which the throttle control trigger, the brake band, and the kickback braking mechanisms are structurally interrelated in these types of chainsaws. It reduces the finger fatigue experienced when squeezing the throttle control trigger to overcome the bias that draws the brake band against the brake drum. It also prevents the kickback braking mechanisms from forcing the throttle control trigger to the non-squeezed position when the kickback brake is activated. More particularly, a freewheeling cam is associated with the throttle control trigger, the throttle rod, the brake band and the kickback braking mechanisms to reduce finger fatigue and completely release the throttle control trigger from the elements of the kickback braking mechanism when the kickback brake is activated. Thus, there is no shock to the trigger finger and the kickback braking mechanism operates independently of the new throttle control mechanism.

With reference to FIG. 1, the present invention is described in its normal off throttle position (i.e., trigger 20 is not squeezed to drive chain 12). In FIG. 1, one may assume that they are either looking at components behind a cover plate and secured to the main body of chainsaw 10 (as in an inboard embodiment), or one may consider that the components shown are secured to a cover plate (as in an outboard embodiment), with the cover plate being see-through in the figures. In either an inboard or outboard embodiment, brake drum 28 is provided in the main body of chainsaw 10. Brake drum 28 is rotated by the squeezing of throttle control trigger 20, and this rotation activates a centrifugal clutch that advances saw chain 12 about saw bar 11. Brake band 30 is disposed around brake drum 28, and is secured to other components of chainsaw 10 at movable end 32 and stationary end 34. Movable end 32 is connected to braking mechanism 36 at lever arm 38, which is biased in the direction of arrow A about pivot point 39 by compression spring 40. In the off throttle position, the bias of spring 40 pulls brake band 30 against drum 28 independent of spring 80 (mentioned below) and with enough force to prevent the rotation thereof, thus preventing the advancement of chain 12, i.e., chain run down. The position of lever arm 38 is limited by the interaction of other components of braking mechanism 36 as generally known.

It should be appreciated that the detailed configuration of the various elements of braking mechanism 36 may change from one chainsaw to another, particularly when considering chainsaws produced by different manufacturers. Thus, herein, the general knowledge of those of ordinary skill in the art is relied upon, and detailed configurations beyond that necessary to comprehend the functioning and practice of the present invention are not drawn and particularly disclosed. It is sufficient to understand that brake band 30 is biased by elements of braking mechanism 36 to engage brake drum 28 when throttle control trigger 20 is at its normal off throttle position. With this understanding, the elements and functioning of the throttle control mechanism of this invention is disclosed below.

A throttle control mechanism in accordance with this invention is shown and designated by numeral 50, and includes throttle control trigger 20. Optionally, trigger 20 may be longer than the triggers of the prior art, which typically provide room for one trigger finger. By making trigger 20 longer, the operator may squeeze trigger 20 with one or more fingers, reducing finger fatigue due to the mechanical advantage realized from the longer trigger. Finger fatigue is additionally reduced through what is termed herein an "arced brake control," explained later in this disclosure.

Figures 3, 4, 5:
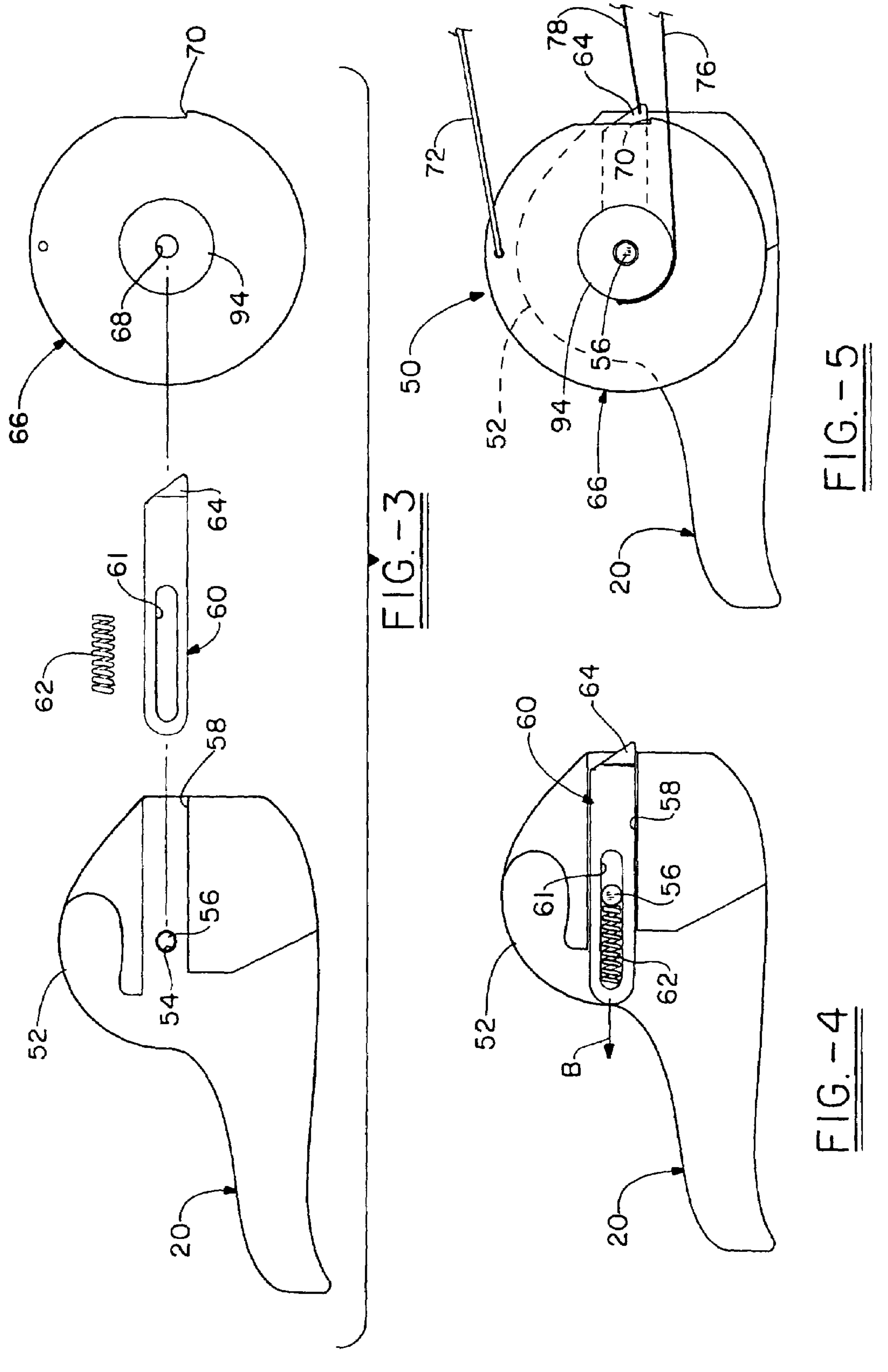
FIG. 3 is a side view of the assembly of the throttle trigger and associated elements of a chainsaw in accordance with this invention.
FIG. 4 is a side view of the throttle trigger of FIG. 3, shown partially assembled.
FIG. 5 is a side view of the throttle trigger of FIG. 3, shown fully assembled with connections to a braking cable and throttle rod.

With reference to FIGS. 3-5, trigger 20 extends from body portion 52, which includes aperture 54 in channel 58. Aperture 54 fits over throttle pivot pin 56, which is secured to the main body of chainsaw 10, and the elements of throttle control mechanism 50 rotate about throttle pivot pin 56 when trigger 20 is squeezed and released. Trigger 20 and body portion 52 are biased to the normal off throttle position in a known manner. Actuator bar 60 includes a slot 61 and fits over pin 56, within channel 58, and is biased in the direction of arrow B by actuator biasing member 62. In this embodiment, a spring is employed as biasing member, but it should be appreciated that other suitable biasing members and structures could be employed. Tooth 64 extends outwardly from the end of actuator bar 60 to engage freewheeling cam 66, which fits against body portion 52 and actuator bar 60 by fitting on pin 56 through cam aperture 68. Because the position of actuator bar 60 is maintained by spring 62, tooth 64 normally stays engaged with step 70 and, thus, squeezing trigger 20 to rotate throttle control mechanism 50 about pin 56 causes tooth 64 to push on step 70 and rotate freewheeling cam 66, which, as it's name implies, is freewheeling on pin 56 and would not otherwise advance upon the squeezing of trigger 20.

Throttle rod 72 is connected between freewheeling cam 66 and carburetor 74 (FIGS. 1 and 2), and brake cable 76 connects between cam 66 and elements of braking mechanism 36 so that squeezing trigger 20 pushes throttle rod 72 to provide power to drive drum 28, as known, and pulls cable 76 to manipulate elements of braking mechanism 36 to overcome the bias on brake band 30 and release it from its engagement with brake drum 28. In the preferred embodiment shown, brake cable 76 is secured to be pulled by an "arced brake control," designated by the numeral 94 and functionally discussed more particularly below with reference to FIGS. 6 and 7. It should be appreciated that this is merely preferred, and brake cable 76 could be secured to a specific point on cam 66 or to a lever arm, as discussed with reference to FIG. 6. In the broadest sense, brake cable 76 is secured to elements of braking mechanism 36 so that squeezing trigger 20 and pulling cable 76 overcomes the bias acting on brake band 30 and thus loosens it from around brake drum 28.

Here, cable 76 is secured to lever arm 38, and squeezing trigger 20 causes brake cable 76 to pull on lever arm 38, about pivot pin 39 and against spring 40, moving movable end 32 of brake band 30 in the direction of arrow C and distancing brake band 30 from drum 28, thereby releasing drum 28 from the braked state. By connecting brake cable 76 to throttle control mechanism 50 in this manner, an active position, wherein the saw chain may be advanced about the saw bar, is achieved upon pulling trigger 20 to provide the driving force to the saw chain, and the braking position is achieved upon release of trigger 20 or, independently, upon activation of kickback braking mechanisms, typically through movement of hand guard 16.

In the prior art chainsaw configurations that associate the throttle trigger with the brake band to release the brake drum from the braked state upon squeezing the trigger and brake the brake drum upon release of the trigger, when the operator trips the kickback brake, the braking mechanisms (usually a large, strong spring, such as spring 80, and associated lever arms) force the throttle trigger to its normal non-squeezed position, causing the operator's finger to be uncomfortably forced open. The present invention prevents this from occurring by further associating actuator bar 60 with kickback guard 16.

Figure 2:
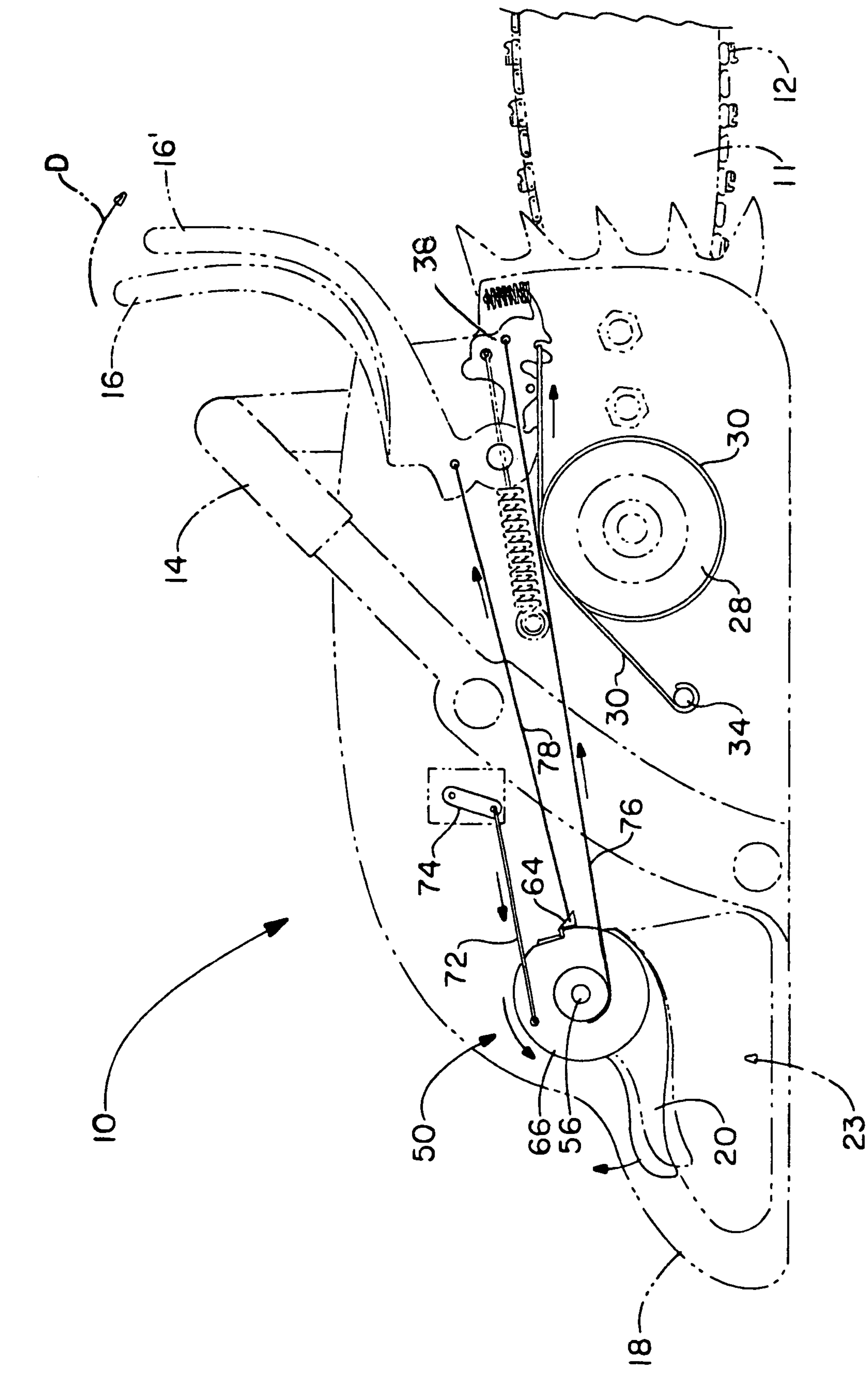
FIG. 2 is a side view of a chainsaw in accordance with this invention, shown with the throttle control trigger squeezed but released from an associated freewheeling cam such that the trigger is essentially temporarily disconnected from the major functioning elements of the chainsaw.

With reference to FIGS. 1, 2 and 5, it can be seen that trigger release cable 78 attaches between kickback guard 16 and actuator bar 60. Recalling that actuator bar 60 is spring biased to keep tooth 64 engaged with step 70, tripping kickback braking mechanism 36 by rotating kickback guard 16 in the direction of arrow D pulls trigger release cable 78 in the direction of arrow E, thus pulling actuator bar 60 to disengage tooth 64 from step 70. This releases freewheeling cam 66 from trigger 20, and cam 66 and brake band 30 are pulled by brake cable 76 and spring 40 to their normal rest positions pulling brake band 30 against drum 28 to prevent its rotation and moving throttle rod 72 to close the carburetor and stop the driving of the centrifugal clutch. Such movements are represented by the unlabeled arrows in FIG. 2.

Resetting kickback guard 16 permits spring 62 to pull actuator bar 60 and tooth 64 against cam 66, and releasing trigger 20 allows actuator bar 60 to be brought into orientation to engage step 70. Thus, there is no force on an operator's finger when the kickback brake is activated, as in prior art chainsaws that attempted to associate movement of the brake band with movement of the trigger. This is one way in which the present invention addresses finger fatigue and shock to the trigger finger. It should be appreciated that "actuator bar" is to interpreted very broadly because virtually any structure rotating about a pivot point may be used to engage and press against the freewheeling cam of the throttle control mechanism. And although a particular pivot point and element orientation was chosen for disclosure, other orientations and pivot points could be used to cause the actuator bar to releasably contact the freewheeling cam as desired. In other chainsaw embodiments in accordance with this invention, finger fatigue is further reduced through the use of what is termed herein an "arced brake control."

Figure 6:
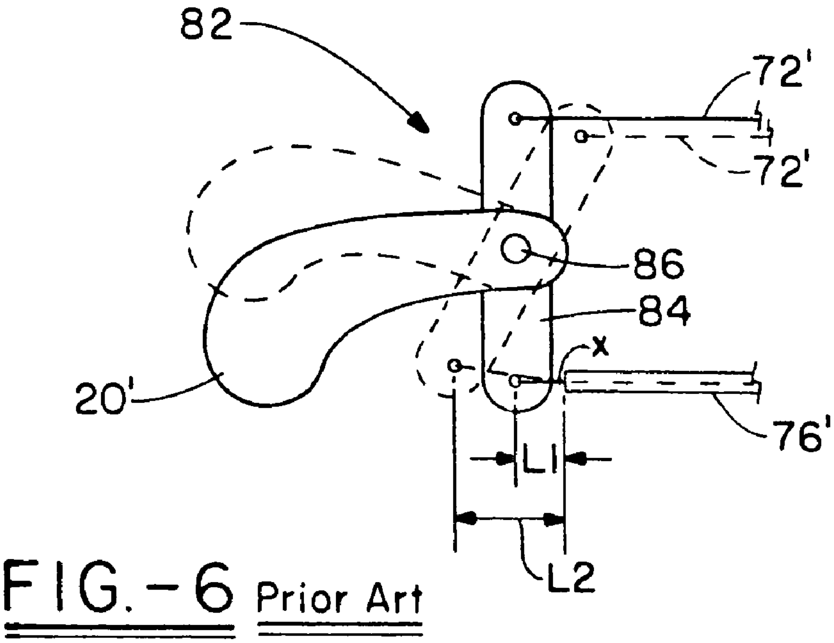
FIG.-6 Prior Art
FIG. 6 is a schematic view of prior art throttle control mechanisms employing lever arms.
Figure 7:
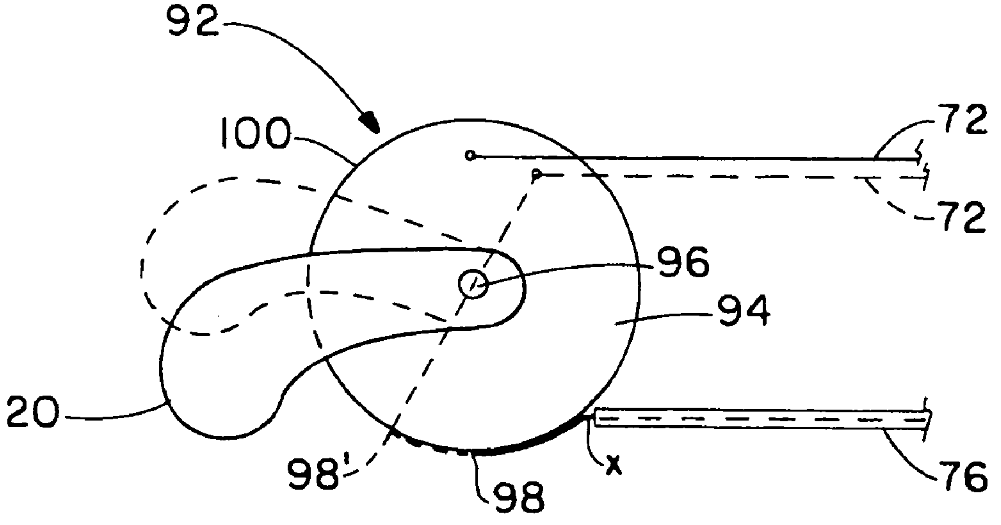
FIG. 7 is a schematic view of an embodiment of a throttle control mechanism in accordance with a preferred embodiment of this invention, employing what is termed herein as an "arced brake control."

In particularly preferred embodiments, the connection between throttle control mechanism 50 and brake cable 76 is configured to provide advantages over prior art connections. FIG. 6 is provided to show the general configuration of the prior art, and FIG. 7 is provided to show the configuration provided in a preferred embodiment according to this invention. These figures are minimized to show only the relevant elements. How this concept is practiced in throttle control mechanism 50 should be readily apparent by the identification of arced brake control 94 in mechanism 50. Thus, in FIG. 6, which is to generally depict a prior art chainsaw that employs a cable to be pulled by the pulling of the throttle control mechanism, namely U.S. Pat. No. 4,683,660, cable 76' is operatively connected to throttle control mechanism 82 through a lever arm 84, which shares a common pivot point 86 with throttle control trigger 20'. In order to help disclose the advances provided by the preferred connection means of this invention, cable 76' is considered to be fixed at point "X" shown in FIG. 6. When throttle control mechanism 82 is squeezed, cable 76' is pulled to a new position defined by the movement of lever arm 84. Such a position is shown in phantom in FIG. 6, and the distance cable 76' is pulled is the difference between the length of cable extending from X to the lever arm 84 (herein measured between the lines defining L1) in the pre-squeezed position and the length extending from X to lever arm 84 (herein measured between the lines defining L2) in the squeezed position. Notably, cable 76' always extends in a straight line from fixed end X to lever arm 84. Thus, the length between L1 could be compared to the length between L2 to determine the actual distance that cable 76' is pulled. And although the connection point of cable 76' on lever arm 84 travels through an arc, the distance that cable 70 is pulled is defined by the straight lines mentioned above.

Referring now to FIG. 7, it can be seen that the lever arm of the prior art (e.g., lever arm 84) is replaced by what is referred to herein as an "arced brake control" 94, which pivots with throttle control mechanism 92 at pivot point 96. Cable 76 extends from a fixed point designated at "X" to connection 98 at the periphery 100 of arced brake control 94. Thus, when throttle control mechanism 92 is squeezed, cable 76 is pulled to a new position (98') that is defined by the amount of cable 76 taken up by the periphery 100 of arced brake control 94. Thus, even when the distance between pivot point 96 and the connection of cable 76 to arced brake control 94 is the same as the distance between pivot point 86 and the connection of cable 76 to lever arm 84, squeezing throttle control mechanism 92 the same distance as throttle control mechanism 82 causes cable 76 to be pulled further than cable 76' because cable 76 must wind around arced brake control 94. In order to configure a lever arm 84 to pull the same length of cable as pulled by arced brake control 94, lever arm 84 must be extended, and the extension will result in requiring a greater deal of force against the throttle control trigger to pull cable 76'. Thus, the preferred arced brake control 94 of FIG. 7 permits more cable to be pulled at a lesser pulling force than the lever arms of the prior art.

Throttle rods 72 (present invention, FIG. 7) and 72' (prior art, FIG. 6) also move according to the movement of the throttle control mechanisms 92 and 82, respectively, as generally known in the art, to provide driving power to the chain.

It should be appreciated that the focus of this arced brake control is on pulling the brake cable around a periphery of the arced brake control, and, thus, it is not absolutely necessary that the brake cable be secured at the perimeter of the arced brake control so long as the length of cable is pulled by winding the length about the controller. A different type of connection is shown in FIGS. 1-5, wherein the cable is wound partially around the perimeter of the arced brake control in the normal off throttle position. "Winding," in this context, entails any length of cable extending around the periphery, and it does not require that it actually wind 360 degrees around the arced brake control. Additionally, while a circular arced brake control is shown and is sufficient, other arcs, including cycloidal arcs, could be used and should be understood as being covered by the terms "arc" or "arced." A cycloidal arc may lessen the finger fatigue to an even greater extent.

From the foregoing, it should be clear that this invention provides many improvements to chainsaws, their braking mechanism and throttle control mechanisms. While a full and complete description of the invention has been set forth in accordance with the dictates of the patent statutes, it should be understood that modifications can be resorted to without departing from the spirit hereof. This invention is not to be limited to the preferred embodiments disclosed herein. The claims will define the invention.

What is claimed is:

1. A chainsaw comprising:

a brake cable; and a throttle control mechanism including:

- a throttle control trigger rotating at a pivot point between an off throttle position and an on throttle position,
- a freewheeling cam providing a ratchet tooth, wherein said brake cable is secured to said freewheeling cam; and
- an actuator arm associated with said throttle control trigger to rotate therewith, said actuator arm engaging said ratchet tooth of said freewheeling cam such that rotation of said throttle control trigger from said off throttle position to said on throttle position causes movement of said freewheeling cam through the engagement with said actuator arm, and movement of said freewheeling cam causes movement of said brake cable.

2. The chainsaw of claim 1, further comprising:

a release cable secured to said actuator arm such that movement of said release cable in an intended direction disengages said actuator arm from said ratchet tooth.

3. The chainsaw of claim 2, further comprising:

a front hand guard; and kickback braking mechanisms, wherein said release cable is secured between said actuator arm and said front hand guard, said front hand guard being movable to activate said kickback braking mechanisms and, at the same time, move said release cable to disengage said actuator arm from said ratchet tooth.

4. The chainsaw of claim 1, further comprising:

a brake drum;

a brake band disposed around said brake drum; and a biasing mechanism pulling said brake band to frictionally engage said brake drum and put said brake drum in a braked state, wherein said brake cable is secured between said freewheeling cam and said biasing mechanism such that rotation of said throttle control trigger from said off throttle position to said on throttle position causes movement of said brake cable to affect said biasing mechanism to stop it from pulling said brake band to frictionally engage said brake drum, thereby releasing said brake drum from the braked state.

5. The chainsaw of claim 4, wherein said biasing mechanism includes a spring biased lever arm.

6. The chainsaw of claim 5, wherein said freewheeling cam includes an arced brake control and said brake cable is secured to said freewheeling cam at said arced brake control such that rotation of said throttle control trigger from said off throttle position to said on throttle position causes a portion of said brake cable to be wound on a perimeter of said arced brake control.

7. A chainsaw comprising:

a brake drum;

a saw bar;

an saw chain disposed about said saw bar, wherein rotation of said brake drum at sufficient velocity causes said saw chain to be advanced about said saw bar;

a biasing mechanism;

a brake band disposed around said brake drum and having a brake end that is associated with said biasing mechanism and biased thereby to draw said brake band against said brake drum and prevent the rotation thereof;

a brake cable; and a throttle control mechanism including:

a throttle control trigger rotating at a pivot point between an off throttle position and an on throttle position, a freewheeling cam providing a ratchet tooth, wherein said brake cable is secured between said freewheeling cam and said biasing mechanism; and an actuator arm associated with said throttle control trigger to rotate therewith, said actuator arm engaging said ratchet tooth of said freewheeling cam such that rotation of said throttle control trigger from said off throttle position to said on throttle position causes movement of said freewheeling cam through the engagement with said actuator arm, and movement of said freewheeling cam causes movement of said brake cable to overcome the bias of said biasing mechanism and space said brake band from said brake drum.

8. A chainsaw comprising:

a brake drum;

a brake band;

a braking mechanism;

a throttle control trigger rotating at a pivot point between an off throttle position and an on throttle position;

an arced brake control associated with said throttle control trigger to move as the throttle control trigger is rotated;

a cable secured between said arced brake control and said braking mechanism such that rotation of said throttle control trigger from said off throttle position to said on throttle position causes a portion of said cable to be wound on a perimeter of said arced brake control thereby causing said braking mechanism to move.

* * * * *